March 21, 1950     M. C. MAGARIAN     2,501,068

BEARING FOR HARROWS

Filed Oct. 11, 1946

INVENTOR.
M. C. Magarian
BY
ATTYS

Patented Mar. 21, 1950

2,501,068

UNITED STATES PATENT OFFICE 2,501,068

BEARING FOR HARROWS

Masick C. Magarian, Fresno, Calif.

Application October 11, 1946, Serial No. 702,647

5 Claims. (Cl. 308—19)

This invention is directed to, and it is an object to provide, an improved bearing unit for disc harrows.

Another object of this invention is to provide a bearing unit, for the purpose described, which is simple yet rugged in construction, and requires a minimum of maintenance or repair.

A further object of the invention is to provide a bearing unit for disc harrows, wherein the discs are secured on the central supporting shaft in a manner whereby said shaft rotates with the discs; the shaft in turn being mounted in connection with a novel bearing assembly.

An additional object is to provide the bearing unit with advantageous lubricating means and lubricant seals.

It is also an object of the invention to provide a bearing unit designed for ease of assembly; the parts being arranged so that they may be assembled as a unit and the latter then engaged on the supporting shaft.

A further object of the invention is to produce a practical device and one which will be exceedingly effective for the purpose for which it is designed.

These objects are accomplished by means of such structure and relative arrangement of parts as will fully appear by a perusal of the following specification and claims.

Figure 1:
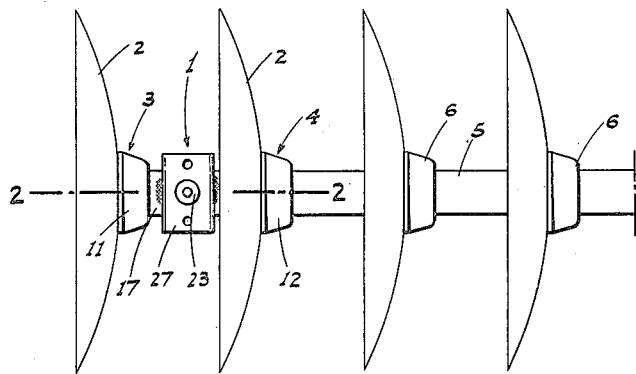
Figure 1 is a fragmentary top plan view of a disc harrow gang illustrating one of the bearing units as in use.

Referring now more particularly to the characters of reference on the drawings, the invention is adapted to be embodied in a disc gang, as in Fig. 1, with one of the bearing units, indicated generally at 1, mounted between the two endmost discs 2 at each end of said gang. The two endmost discs 2 at each end of the gang are supported by the corresponding bearing unit 1 which includes an outer split hub, indicated generally at 3, and an inner split hub, indicated generally at 4. The remaining and intermediate discs of the gang are supported and maintained in proper spaced relation by spacer sleeves 5 and other split hubs 6; the entire gang assembly being carried on a central shaft 7, here of hexagonal configuration in cross section, for the purpose hereinafter described. The parts of the gang are maintained in proper assembly on the shaft 7 by means of end nuts 8 locked in place by lock washers 9; the hubs being rotatable with said shaft.

Each of the bearing units 1 is constructed and mounted on the central shaft 7 in the following manner:

The outer and inner split hubs 3 and 4 comprise cooperating hub sections 10 and 11, and 12 and 13, respectively. The hub section 10 is formed for bearing engagement by the nut 8 whereas the hub section 12 includes a bore 14 for the reception of the adjacent one of the spacer sleeves 5.

The hub sections 11 and 13, of the split hubs 3 and 4, respectively, are formed at adjacent ends with like diameter bores 15 internally enlarged, as shown, for the reception of annular sealing elements 16.

Figure 2:
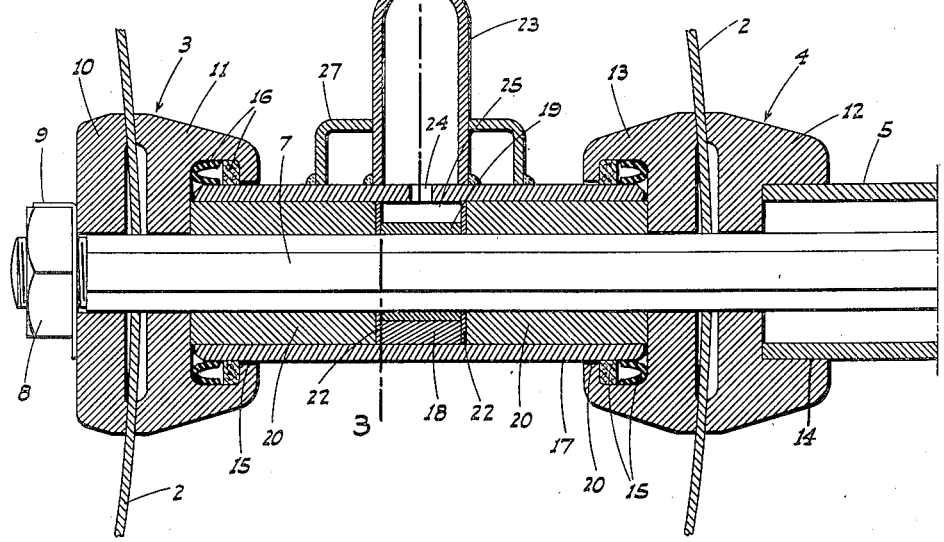
Figure 2 is an enlarged fragmentary sectional elevation on line 2—2 of Fig. 1.
Figure 3:
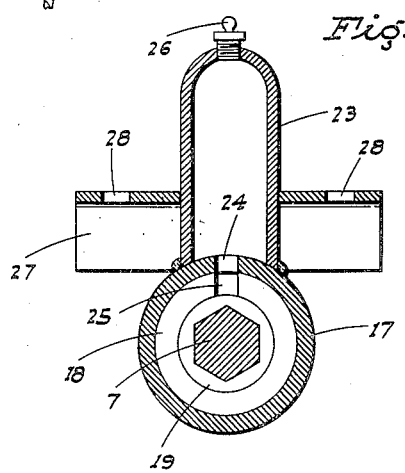
Figure 3 is a fragmentary cross section on line 3—3 of Fig. 2.
Figure 4:
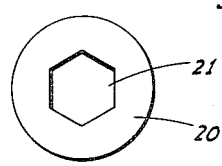
Figure 4 is an end view of one of the bearing bushings detached.

The two adjacent endmost discs 2 are clampingly engaged between the hub sections 10 and 11, and 12 and 13, of the hubs 3 and 4, respectively, in the manner clearly shown in Fig. 2, and a bearing sleeve 17 surrounds the shaft 7 in clearance relation between said hubs.

Opposite end portions of the bearing sleeve 17 project into the bores 15 with a clearance fit and are therein engaged by the annular sealing elements 16.

Centrally of its ends, and interiorly thereof, the bearing sleeve 17 is fitted with a thrust collar 18 fixed to said sleeve, and a spacer ring 19 is disposed concentrically and with a relatively close running fit within said collar; the spacer ring 19 having a hexagonal bore through which the shaft 7 matchingly projects.

Bearing bushings 20, having rexagonal bores 21, are engaged, in relatively slidable relation, on the shaft 7 on opposite sides of the thrust collar 18 and spacer ring 19 therein; said bearing bushings 20 supporting the bearing sleeve 17 with a relatively close running fit.

Thrust washers 22 are disposed on the shaft 7 between the thrust collar 18 and adjacent ends of the bearing bushings 20; the axial extent of the latter being such that their outer ends project slightly beyond corresponding ends of the bearing sleeve 17. Thus the hub sections 11 and 13 may be brought into positive frictional engagement with adjacent ends of the bearing bushings 20 while permitting the bearing sleeve 17 to remain stationary upon rotation of the shaft 7 and the hub mounted discs thereon.

A lubricant dome 23 is fixed on, and upstands from, the bearing sleeve 17 centrally of its ends, and communicates through a port 24 with the interior of said bearing sleeve 17; the thrust collar 18 being cut away or split, as at 25, in alinement with the port 24 whereby lubricant may gain ready access into the central assembly of the bearing unit. A fitting 26 on the outer end of the dome 23 is provided for the purpose of introducing lubricant into said dome.

On top of the bearing sleeve 17 is fitted a horizontal generally tangential bracket bar 27 which is of inverted channel configuration in cross section; the dome 23 projecting upwardly therethrough intermediate the ends of said bearing. The bracket bar 27 is perforated, as at 28, for attachment of said bar to the frame of the implement. In this manner each bearing unit 1 can be fixedly secured to the implement frame.

When the described bearing unit is in use in a disc gang, the bearing sleeve 17, together with bracket bar 27 and lubricant dome 23, remain stationary; the assembly of the central shaft 7, the bearing bushings 20, spacer ring 19, and the hubs 3 and 4, together with the discs clamped therein, rotating upon advance of the implement.

Each bearing unit 1 can, by reason of the design thereof, be wholly assembled separately from the shaft 7, and then applied thereto materially facilitating assembly of the device.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A bearing unit for a disc gang having a non-circular rotatable shaft and spaced apart disc supporting hubs mounted on the shaft, said unit comprising a stationary bearing sleeve disposed between a pair of the hubs and surrounding the shaft in clearance relation, a thrust collar fixed in the sleeve intermediate its ends, a pair of axially alined but spaced bearing bushings mounted in and supported by the sleeve, each bushing being interposed between one of the hubs and the thrust collar, the hubs and bushings having non-circular bores through which the shaft matchingly extends, and means securing said pair of hubs and the bushings in engagement and against axial separation.

2. A structure as in claim 1 in which the thrust collar extends about the shaft in clearance relation and is provided with a split at the top, and a lubricant reservoir on the sleeve in communication with the interior of the sleeve at the split.

3. A structure as in claim 1 in which the thrust collar is provided with a circular bore concentric to but of larger diameter than the shaft, and an annular spacer ring turnable in said bore, said ring having an axial bore through which the shaft extends in matching relation.

4. A structure as in claim 3 including thrust washers interposed between the collar and the adjacent ends of the bushings.

5. A bearing mount for a disc gang having a non-circular rotatable shaft and spaced apart disc supporting hubs mounted on the shaft, said unit comprising a stationary bearing sleeve disposed between a pair of the hubs and surrounding the shaft in clearance relation, a thrust collar fixed in the sleeve intermediate its ends, said collar being provided with a circular bore concentric to but of larger diameter than the shaft, an annular spacer ring turnable in said bore, said ring having an axial bore through which the shaft extends in matching relation, said collar being split at a point in its circumference, a lubricant reservoir on the sleeve, said reservoir being in communication with the interior of said sleeve at the split in the collar, a pair of axially alined but spaced bearing bushings mounted in and supported by the sleeve, each bushing being interposed between one of the hubs and the thrust collar, the hubs and bushings having non-circular bores through which the shaft matchingly extends, and means securing said pair of hubs and the bushings in engagement and against axial separation.

MASICK C. MAGARIAN.

REFERENCES CITED

The following references are of record in the file of this patent:

UNITED STATES PATENTS

| Number | Name | Date |
|---|---|---|
| 861,704 | Brew | July 30, 1907 |
| 1,287,518 | Thompson | Dec. 10, 1918 |
| 1,971,547 | White | Aug. 28, 1934 |
| 2,097,244 | Sjorgen | Oct. 26, 1937 |